US012610107B2

(12) United States Patent
Xiao et al.

(10) Patent No.: US 12,610,107 B2
(45) Date of Patent: **\*Apr. 21, 2026**

(54) RECOMMENDATION SYSTEM FORWARD SIMULATOR

(71) Applicant: ROKU, INC., San Jose, CA (US)

(72) Inventors: Fei Xiao, San Jose, CA (US); Abhishek Bambha, Burlingame, CA (US); Nam Vo, San Jose, CA (US); Pulkit Aggarwal, San Jose, CA (US); Rohit Mahto, San Jose, CA (US)

(73) Assignee: Roku, Inc., San Jose, CA (US)

( \* ) Notice: Subject to any disclaimer, the term of this patent is extended or adjusted under 35 U.S.C. 154(b) by 206 days.

This patent is subject to a terminal disclaimer.

(21) Appl. No.: 17/983,138

(22) Filed: Nov. 8, 2022

(65) Prior Publication Data

US 2024/0155195 A1    May 9, 2024

(51) Int. Cl.
*H04N 21/466*    (2011.01)
*H04N 21/258*    (2011.01)
*H04N 21/482*    (2011.01)

(52) U.S. Cl.
CPC ... *H04N 21/4668* (2013.01); *H04N 21/25883* (2013.01); *H04N 21/4826* (2013.01)

(58) Field of Classification Search
CPC ......... H04N 21/4668; H04N 21/25883; H04N 21/4826

USPC ........................................................... 725/44
See application file for complete search history.

(56) References Cited

U.S. PATENT DOCUMENTS

| | | | |
|---|---|---|---|
| 2019/0019213 A1* | 1/2019 | Silberman .......... | G06Q 30/0244 |
| 2019/0373332 A1* | 12/2019 | Kim ........................ | G06N 20/20 |
| 2021/0274256 A1* | 9/2021 | Kadam .............. | H04N 21/4532 |
| 2021/0397846 A1* | 12/2021 | Chang ................... | A63F 13/828 |
| 2022/0343366 A1* | 10/2022 | Hubbard ............ | G06Q 30/0242 |

\* cited by examiner

*Primary Examiner* — Alfonso Castro
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for utilizing a content acquisition recommendation system to generating a set of candidate content assets, generate embeddings and popularity score estimates for the set of candidate content assets, aggregate the set of candidate content assets with a set of existing content assets to generate a simulation set of content assets, determine a target set of users for the simulation set of content assets, generate, for at least a portion of the target set of users and based on a trained machine learning model, a result set of recommended content assets, determining an impact of the candidate content assets located in the result set of recommended content assets and generate a proposal for an acquisition of candidate content assets.

18 Claims, 7 Drawing Sheets

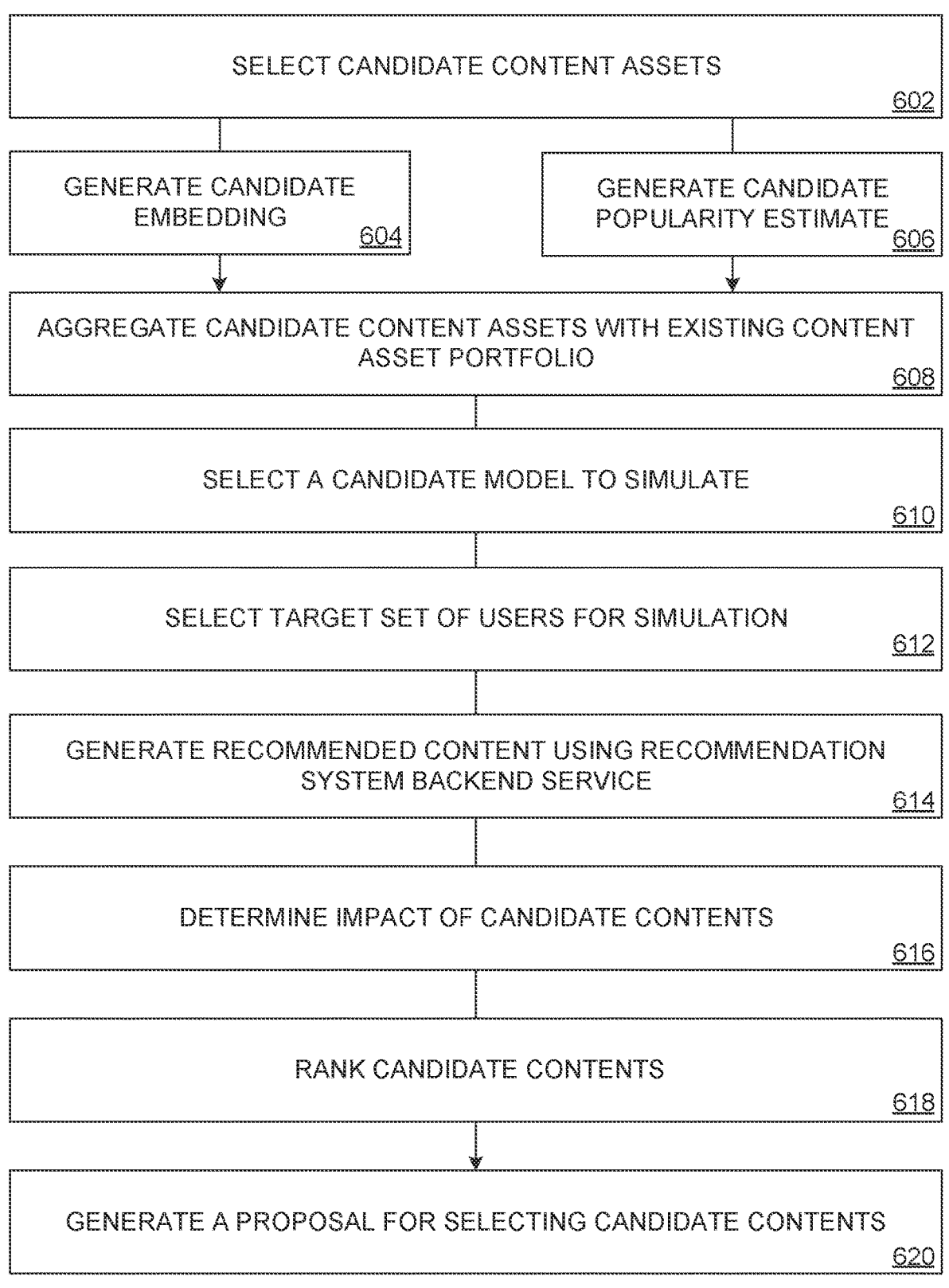

SELECT CANDIDATE CONTENT ASSETS
602

GENERATE CANDIDATE EMBEDDING
604

GENERATE CANDIDATE POPULARITY ESTIMATE
606

AGGREGATE CANDIDATE CONTENT ASSETS WITH EXISTING CONTENT ASSET PORTFOLIO
608

SELECT A CANDIDATE MODEL TO SIMULATE
610

SELECT TARGET SET OF USERS FOR SIMULATION
612

GENERATE RECOMMENDED CONTENT USING RECOMMENDATION SYSTEM BACKEND SERVICE
614

DETERMINE IMPACT OF CANDIDATE CONTENTS
616

RANK CANDIDATE CONTENTS
618

GENERATE A PROPOSAL FOR SELECTING CANDIDATE CONTENTS
620

FIG. 6

RECOMMENDATION SYSTEM FORWARD SIMULATOR

BACKGROUND

Field

This disclosure is generally directed to identifying content, and more particularly to recommendation systems recommending future content based on its predicted impact.

Background

Generally, content is added to a content distribution ecosystem based on one or more acquisition strategies. However, determining an impact of new content on an existing content portfolio may be difficult for several reasons. Content acquisition may currently be based on a performance optimization using predicted popularity, but may not translate into an actual content experience for the user. For example, it may be very difficult to predict the metrics for a set of movies or series, since they are competing with each other for user impressions. This approach does not solve the content acquisition problem of acquiring the best, most desired content that a customer base is likely to take action on.

SUMMARY

Provided herein are system, apparatus, article of manufacture, method and/or computer program product embodiments, and/or combinations and sub-combinations thereof, for utilizing a content recommendation system to predict an impact of new content assets on an existing content asset portfolio. This technology allows a Machine Learning (ML) platform to identify potentially desirable new content, which then correspondingly helps drive user reach.

BRIEF DESCRIPTION OF THE FIGURES

The accompanying drawings are incorporated herein and form a part of the specification.

FIG. 6 illustrates a flow diagram for a content acquisition recommendation system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
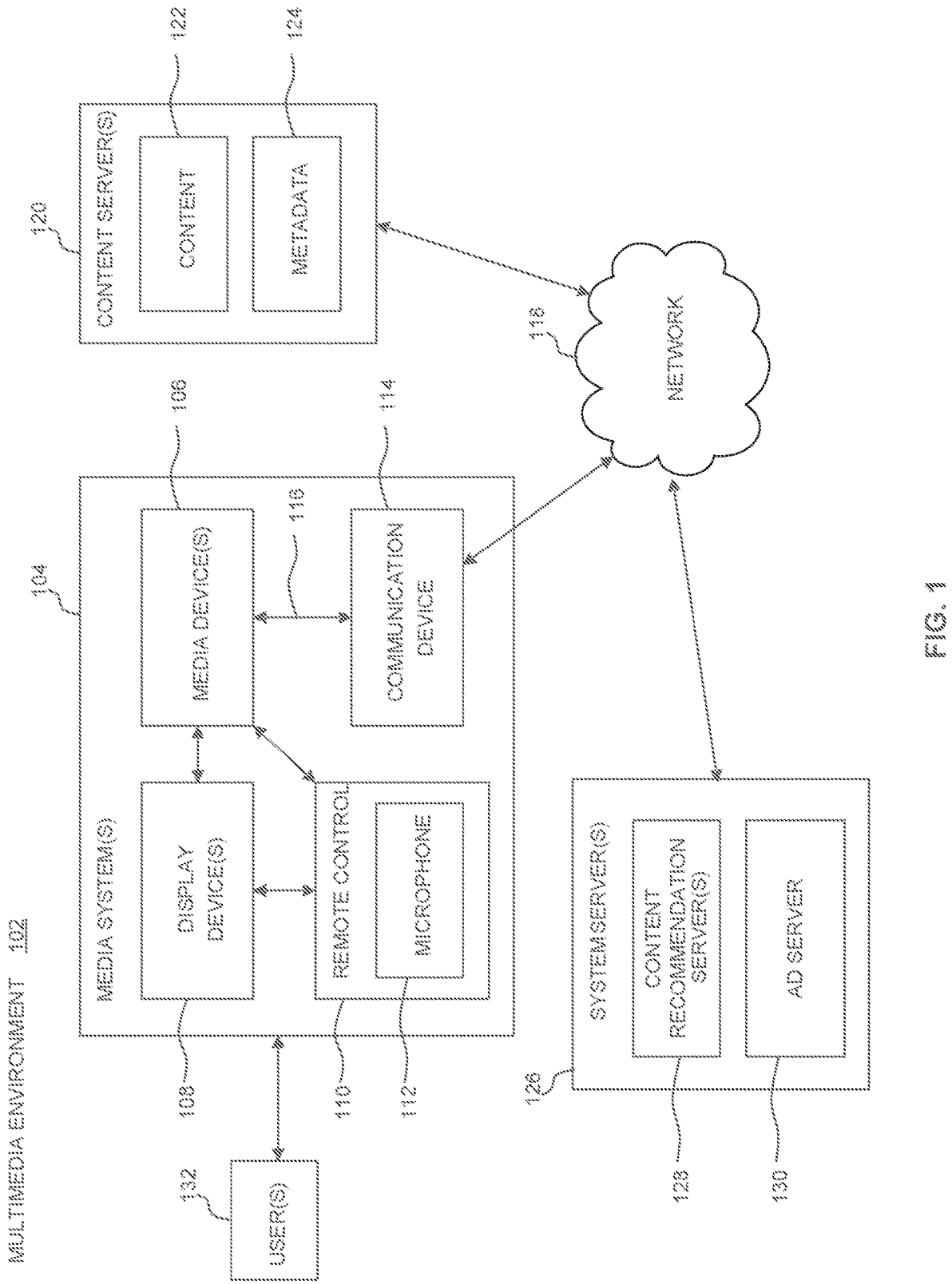
FIG. 1 illustrates a block diagram of a multimedia environment, according to some embodiments.

Provided herein are system, apparatus, article of manufacture, method and/or computer program product embodiments, and/or combinations and sub-combinations thereof, for utilizing a content recommendation system to generate a prediction of an impact of new content on an existing content portfolio. In an exemplary embodiment, the prediction will generate a recommendation strategy that a content platform owner may implement to make new content acquisition(s).

Content acquisition may play central role in overall engagement, user reach, user demographics distribution and revenue. In an effort to acquire a best set of content assets, the performance of a future set of movies and series may depend on many factors, such as, popularity, size of user segment, similarity of content already available, and similarity within the set to be acquired, to name a few.

In some embodiments, the technology disclosed herein implements a recommendation system forward simulator, using an existing platform's user request distribution, to predict the impact of one or more new movies or series if they were added to an existing portfolio of content assets.

In some embodiments, the technology disclosed herein implements simulation of an interaction for sampled users with new content using a recommendation system service to predict an estimation on an overall impact of streaming or reach for different demographic groups.

In some embodiments, the technology disclosed herein implements simulation of an interaction for sampled users with new content using a recommendation system service to predict an estimation on an overall impact of streaming and reach for an active streamer vs a first time visitor.

In some embodiments, the technology disclosed herein implements simulation including a decay effect of a new content. For example, when 50% simulated users have already watched the content, the content will be streamed less in a following month.

In some embodiments, the technology disclosed herein implements a new content embedding estimation to generate similarity metrics for a recommendation system ranking.

In some embodiments, the technology disclosed herein implements a new content assets popularity estimation to assist in a candidate selection model for the new content assets by estimating the popularity of each of the new content assets.

In some embodiments, the technology disclosed herein implements a build content-based model to generate embedding for a new content item for different content recommendation models.

In some embodiments, the technology disclosed herein implements the recommendation system forward simulator by adding new content assets as candidates to an existing portfolio of content assets, sampling X percent of users (e.g., 5%), simulating a user interaction with a recommendation service with the new content assets added and summarizing the simulation results.

In some embodiments, the recommendation system machine learning system implements unsupervised learning models. Unsupervised learning models may facilitate prediction for dynamically changing content, user profiles, demographics of an existing portfolio, or changing target segmentations.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to advertising embodiments and, thus, the system servers 126 may include one or more advertising servers 130. In some embodiments, the media device 106 may display advertisements in the media system 104, such as on the display device 108.

In addition, using information received from the media devices 106 in the thousands and millions of media systems 104, content recommendation server(s) 128 may identify viewing habits, for example, preferences or likes for different users 132 watching a particular movie. Based on such information, the content recommendation server(s) 128 may determine that users with similar watching habits may be interested in watching similar content.

The system servers 126 may also include an audio server (not shown). In some embodiments, the audio data received by the microphone 112 in the remote control 110 is transferred to the media device 106, which is then forwarded to the system servers 126 to process and analyze the received audio data to recognize the user 132's verbal command. The system servers 126 may then forward the verbal command back to the media device 106 for processing.

Figure 2:
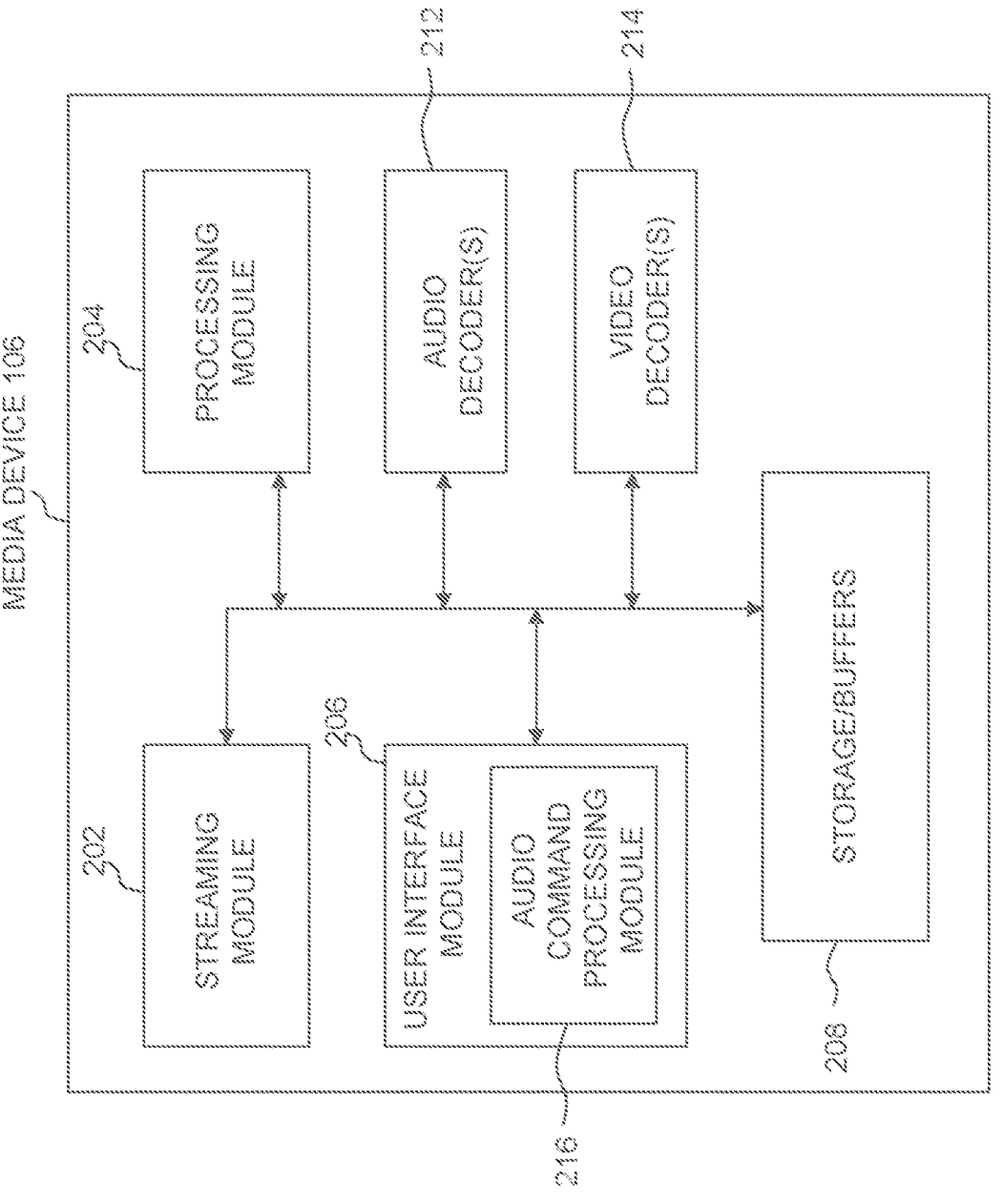
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MKP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from content server(s) 120. In non-streaming embodiments, the media device 106 may store the content received from content server(s) 120 in storage/buffers 208 for later playback on display device 108.

Content Recommendation Services

Referring to FIG. 1, the media devices 106 may exist in thousands or millions of media systems 104. Accordingly, the media devices 106 may lend themselves to content acquisition solution embodiments. In some embodiments, an over-the-top (OTT) media device or service may benefit from the embodiments disclosed herein. An over-the-top (OTT) media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVoD) services that offer access to film and television content (including existing series acquired from other producers, as well as original content produced specifically for the service).

OTT also encompasses a wave of "skinny" television services that offer access to live streams of linear specialty channels, similar to a traditional satellite or cable TV provider, but streamed over the public Internet, rather than a closed, private network with proprietary equipment such as set-top boxes. Over-the-top services are typically accessed via websites on personal computers, as well as via apps on mobile devices (such as smartphones and tablets), digital media players (including video game consoles), or televisions with integrated Smart TV platforms.

In various embodiments, the technology described herein implements a system, apparatus, article of manufacture, method and/or computer program product embodiments, and/or combinations and sub-combinations thereof, for utilizing a content recommendation system to generate a prediction of an impact of new content assets on an existing content asset portfolio. This method allows the platform to present the most relevant ML content that may be streamed on the platform, which then correspondingly helps drive user reach.

A content recommender system, or a content recommendation system, is a subclass of information filtering system that seeks to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

Content recommendation systems are used in a variety of areas, with commonly recognized examples taking the form of playlist generators for movies, series, documentaries, podcasts, music services, and product recommendations, to name a few. In some embodiments, the playlist may be instantiated as a series of visual tiles displaying a sample image of the content or selectable movie trailer. The tiles may be arranged by some selected ordering system (e.g., popularity) and may be arranged in groups or categories, such as "trending", "top 10", "newly added", "sports", "action", etc.

One approach to the design of recommender systems that has wide use is collaborative filtering. Collaborative filtering is based on the assumption that people who agreed in the past will agree in the future, and that they will like similar kinds of items as they liked in the past. The system generates recommendations using only information about rating profiles for different users or items. By locating peer users/items with a rating history similar to the current user or item, they generate recommendations using this neighborhood. Collaborative filtering methods are classified as memory-based and model-based. A well-known example of memory-based approaches is the user-based algorithm, while that of model-based approaches is the Kernel-Mapping Recommender.

A key advantage of the collaborative filtering approach is that it does not rely on machine analyzable content and therefore it is capable of accurately recommending complex items such as movies without requiring an "understanding" of the item itself. Many algorithms have been used in measuring user similarity or item similarity in recommender systems. When building a model from a user's behavior, a distinction is often made between explicit and implicit forms of data collection. An example of explicit data collection may include asking a user to rate an item. While examples of implicit data collection may include observing the items that a user views, analyzing item/user viewing times, keeping a record of content items that a user purchases, or building a list of items that a user has watched on one or more streaming platforms.

Another common approach when designing recommender systems is content-based filtering. Content-based filtering methods are based on a description of the item and a profile of the user's preferences. These methods are best suited to situations where there is known data on an item (name, location, description, etc.), but not on the user. Content-based recommenders treat recommendation as a user-specific classification problem and learn a classifier for the user's likes and dislikes based on an item's features.

In this system, keywords are used to describe the items, and a user profile is built to indicate the type of item this user likes. In other words, these algorithms try to recommend items similar to those that a user liked in the past or is examining in the present. It does not rely on a user sign-in mechanism to generate this often temporary profile. In particular, various candidate items are compared with items previously rated by the user, and the best-matching items are recommended.

Basically, these various methods use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector, while other sophisticated methods use machine learning techniques, such as Bayesian Classifiers, cluster analysis, decision trees, and artificial neural networks in order to estimate the probability that the user is going to like the item.

Content-based recommender systems can also include opinion-based recommender systems. In some cases, users are allowed to leave movie reviews or feedback on the items. Features extracted from the user-generated reviews may improve meta-data of content items. Sentiments extracted from the reviews can be seen as users' rating scores on the corresponding features. Common approaches of opinion-based recommender systems utilize various techniques including machine learning, content recognition, facial recognition, sentiment analysis and deep learning as discussed in greater detail hereafter.

Figure 3:
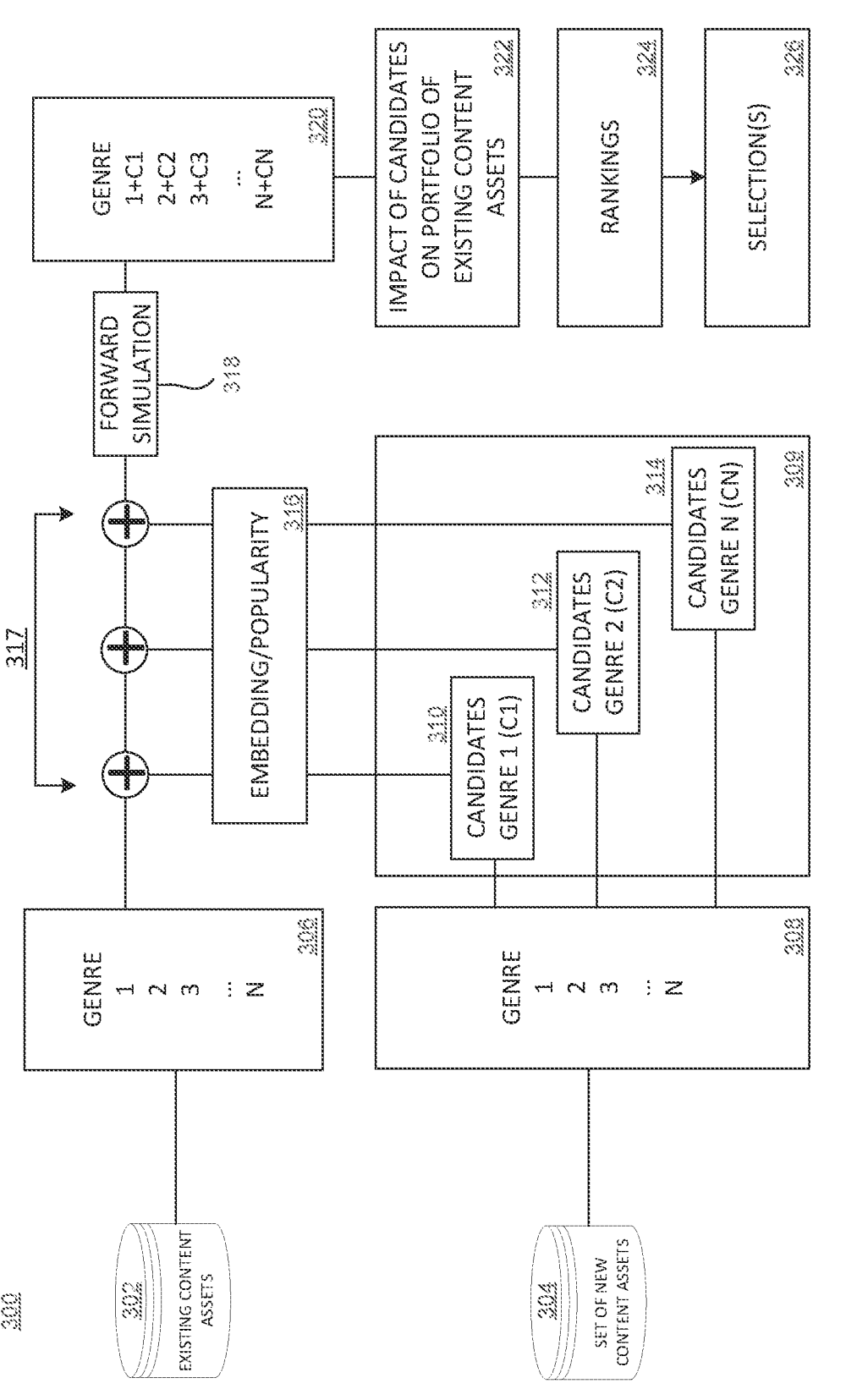
FIG. 3 illustrates an example diagram of a content acquisition recommendation system, according to some embodiments.

FIG. 3 illustrates an example diagram of a content acquisition recommendation system 300, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

In some embodiments, the technology described herein simulates an impact of a set of new content titles so as to find the best titles for acquisition. The recommendation system forward simulator may estimate or predict an impact that new candidate content assets may have on an existing portfolio of content assets.

As previously described, recommendation systems may be at least partially implemented with machine learning systems. Machine learning includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. However, a customer streaming selection of a title from a new set of titles may depend on many factors such as: a user's interest distribution, recommendation models (e.g., row ranking, item ranking, candidate selection, etc.), similar items in the portfolio, etc. Therefore, in an exemplary embodiment, unsupervised learning may carry some technical advantages of flexibility for adapting to new titles, new recommendation models, new users, new target segmentations and new demographics, as they become available.

Alternatively, a supervised learning model may be implemented by estimating a total impression for titles, predicting streaming or impressions for each title and then combining the results.

As shown, a portfolio of existing content assets 302 may be implemented as an aggregation of available streaming media content assets as stored by a media platform, such as, but not limited to, an over-the-top (OTT) media service. The OTT media service portfolio may be offered directly to viewers via the Internet. For example, the portfolio may be stored on content servers 120. To keep the portfolio current and to accomplish specific reach objectives (e.g., reach 18-24 year olds), the current portfolio of content assets will regularly need additional content assets for users to consider and stream.

The following example will describe acquisition recommendation system 300 as it implements processes to improve opportunities to target highly impactful content assets for acquisition. The system will be described at a high level description for a selection of new content asset candidates for one or more genres, however, any known or future categorization or combination of categorizations may be used to select an input candidate set for the forward simulator 318 without departing from the technology described herein. For example, the candidates for acquisition may be alternatively selected by recency of availability, such as, all new movies made available in the last year.

When acquiring a new set of content assets 304, the OTT media service may select from one or more titles from a set as provided, for example, by various content aggregators, content publishers or original content sources. While shown as a set of new content assets, in some embodiments, the OTT media service may select a subset of the entire set for submission to the content acquisition recommendation system 300 for further analysis, or alternatively may select a plurality of subsets. In addition, duplicate titles present in an existing portfolio may be eliminated during the selection process.

In the working example of FIG. 3, the set of new content assets 304 is categorized by genre 308. The OTT media service may find it desirable to add new titles to its portfolio based on one or more specific genres 308 (1-N) as they become popular. For example, if "westerns" were trending up, the candidates for acquisition may be selected from this genre of available titles for acquisition. This candidate set would then be processed by the acquisition recommendation system 300 to generate its predicted impact on the overall portfolio of content assets, or alternatively, its predicted impact on an existing subset of the portfolio. For example, the system may look at an existing customer reach within the existing portfolio of western series content assets and compare it to a new customer reach after adding the selected set of new western series content assets. In this example, the change in reach of the portfolio reflects a prediction of an impact (e.g., positive or negative) of the new content assets on the existing portfolio of content assets. The impact may be any desired streaming metric, such as, but not limited to, likelihood of title selection, streaming time, incremental streaming, customer reach, incremental reach with the new titles on different demographic segments, new customer traction, active streamers, distribution of customer impression of new titles, etc.

In another example, the system may look at an existing customer reach within the existing portfolio of its most popular content assets and compare a new customer reach of that same portfolio after adding the new content assets. In this example, the system may consider a possible negative effect on an existing portfolio by adding the new content assets. For example, by adding the new content assets, existing streaming for the most popular content assets are negatively affected.

In another example, the system may look at existing customer reach within the existing portfolio across multiple genres simultaneously and compare a new reach of that same portfolio after adding the selected set of genre candidates 310, 312 or 314.

Alternatively, or in addition, the acquisition recommendation system 300 may select a portion of its customer base by targeting a specific demographic to see the impact on that demographic when adding the candidate content assets.

In some embodiments, the new content assets may be a list of titles. However, the recommendation system may use metadata and popularity to assist in outputting a ranked set of content assets to recommend to customers. Therefore, in this embodiment, the acquisition recommendation system 300 implements one or more methods to enrich the titles with embedding, such as by adding descriptive metadata and popularity metadata 316, as discussed in greater detail in FIGS. 4 and 5. Embedding may include metadata, such as, but not limited to, associated or ancillary information indicating or related to a writer, director, producer, composer, artist, actor, summary, chapters, production, history, year, trailers, alternate versions, related content, applications, or any other information pertaining or relating to the selected set of new content candidates 309. For example, to add a new content asset to the recommendation system, and simulate a user request based on a user request distribution, the new content assets may need to include metadata with similar metadata and popularity metrics to existing content assets. Metadata may also or alternatively include links to any such information pertaining or relating to the content assets.

Candidate content assets 309 with embedding metadata and popularity metadata are added (317) to existing content assets 302 with their respective embedding metadata and popularity metadata and processed as an aggregated portfolio (e.g., simulation set) by the forward simulator 318 to predict, for example, future streaming rates by genre 320. The forward simulator 318 is implemented as an instance of the recommendation system previously described processing the aggregated portfolio. In other words, the recommendation system processes the aggregated portfolio as if the new content asset titles had already been made part of the available portfolio of streaming assets. In this way, the recommendation system can rank titles of all titles in the aggregated portfolio and discern an impact on the existing portfolio.

In some embodiments, the recommendation system may implement the simulation for a subset of existing users. For example, the recommendation system may process a simulation for a sampling of X percent of users (e.g., customers). In some embodiments, the users may be chosen to meet a desired demographic (e.g., all customers 18-28). In some embodiments, the users may be chosen from a set of poor performing users (e.g., low level of streaming) to see if the new content assets have a positive effect on their existing streaming selections. Conversely, the users may be chosen from a set of high performing users (e.g., high level of streaming) to see if the new content assets have a negative or minimal effect on their existing streaming selections.

In 322, a recommendation result based on the aggregated portfolio is compared to a previously known recommendation result of the existing portfolio (i.e., without the candidate content assets) to determine a measurable streaming impact for one or more metrics. Metrics may be logged for each set of aggregated portfolios that are processed by the forward simulator. For example, they may be logged by genre, age group, predicted popularity, predicted streaming times, etc. In one non-limiting example, predicted future streaming rates may be compared to the existing streaming rates for corresponding genres 306 to determine a streaming rate impact of the new candidate content assets on selected genres of the existing portfolio of content assets.

In one embodiment, the impact may be characterized as an overall improvement or reduction of the impact metric. For example, the impact may be a percentage increase or decrease. While described for streaming rates, any impact metric may be substituted without departing from the scope of the technology described herein. The rankings 324 of each of the candidate content assets within the aggregated portfolio are determined and selections 326 are proffered in a report format. In a non-limiting example, if the set of candidate assets increase predicted streaming times by X percent, then the entire set may be considered for an acquisition recommendation. Alternatively or in addition, only the top N ranked candidate titles may be selected for recommendation. Conversely, if the impact of the candidate content assets is a negative X percent, the candidate set may not be recommended for acquisition. While discussed for positive or negative impacts, a new set of content assets may have a minimal or no impact on the existing portfolio and therefore also may not be recommended for acquisition. In this scenario, a subset of the highest ranked assets may be considered by the forward simulator to see if maybe a smaller acquisition strategy of a focused group of higher performing candidate content assets may be beneficial. Conversely, if the new set of candidate content assets performed far above expectations, additional lower content assets may be added to the acquisition recommendation.

Alternatively, or in addition, multiple subsets of new candidate content assets may be processed through the forward simulator and combined in various combinations in the selections 326 report to meet various business objectives (e.g., expanding reach for multiple age groups). For example, the multiple subsets of new candidate content assets may be offered by different content providers and one business objective would be to aggregate the best candidate content assets from each of the multiple content providers until reaching a streaming goal (e.g., reach).

Figure 4:
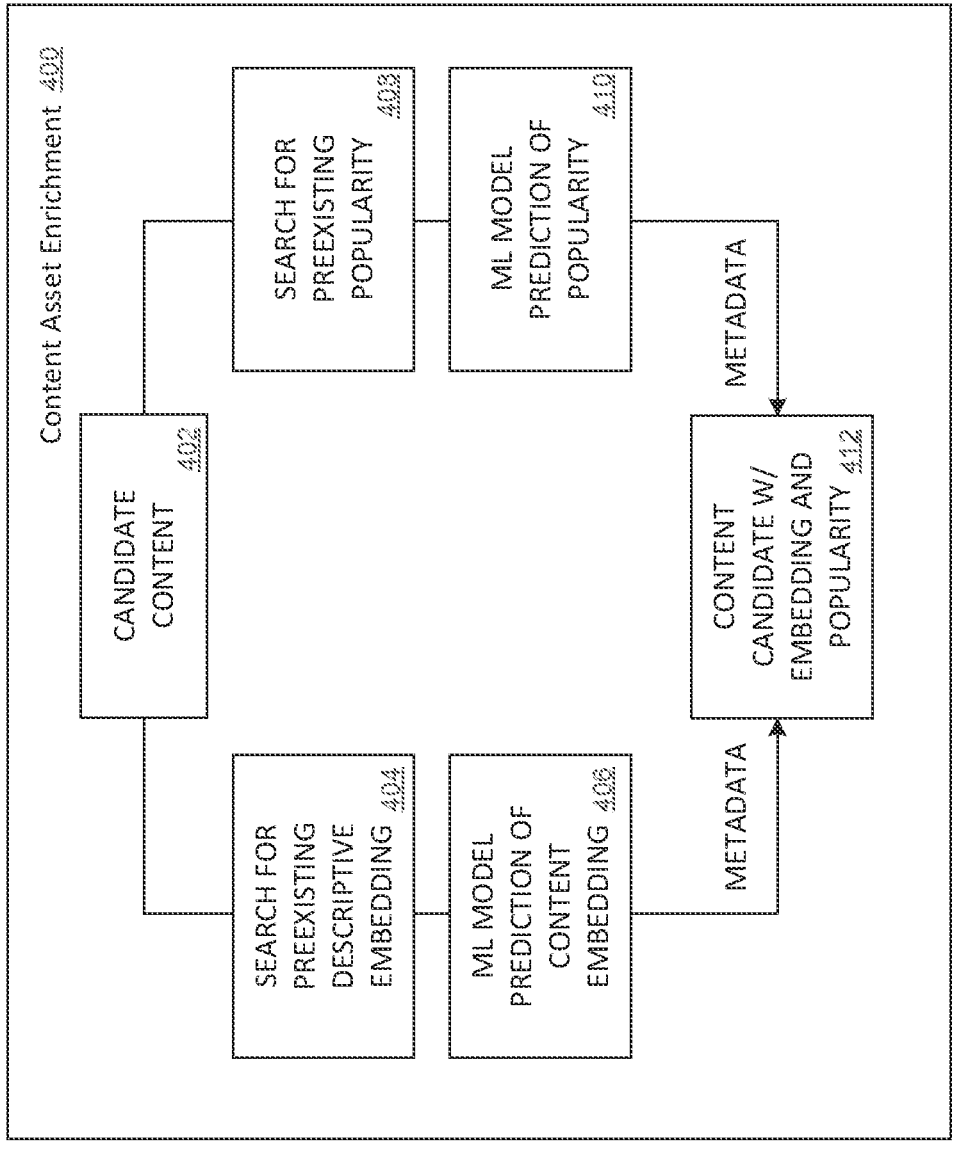
FIG. 4 illustrates an example diagram of a determining embedding, according to some embodiments.

FIG. 4 illustrates an example diagram of a content asset enrichment 400, according to some embodiments.

In some embodiments, the content provider may have provided descriptive metadata embeddings data when providing a candidate content 402 for acquisition. However, in a scenario where the embedding metadata has not been provided, the embedding may be added by other methods as described in greater detail below.

In some embodiments, the system may search 404 for preexisting data for a candidate content asset 402 title that may reveal one or more embeddings. For example, the search may be of the same title in one or more available content asset databases accessible by the content acquisition recommendation system 300. This search may produce one or more embeddings that may be added to enrich the titles.

For those titles not returning embeddings or only returning limited embeddings, a content based ML model 406 may be implemented to predict embedding for similar content to the candidate content asset. For each new title, these content based models will be implemented to predict: new title embedding based on similarity to other titles, images, or descriptions that may be mapped to a new candidate content asset title. Example models, may include, but are not limited to, session-based models, sequential models, a STAMP (Spatial Temporal Multi-level Proposal) model, a Meta model that may include a set of questions designed to identify information, a s2v (sense2vector) model, where a similarity is measured as a cosine similarity between user embedding and content embedding, or a two-tower model that may be implemented as a neural network with two sub-models that learn representations for queries and candidates separately. These models may be run against known content data bases, internet data (e.g. a movie description, movie review, imagery, etc.) or other content provider accessible data.

In some embodiments, the content provider may have provided popularity metadata when providing a set of available titles for acquisition. However, in a scenario where the popularity metadata has not been provided, the metadata may be added by other methods as described in greater detail below.

In some embodiments, the system may search for preexisting popularity data 408 for a candidate content asset title. For example, the search may be of the same title in one or more available content asset databases accessible by the content acquisition recommendation system 300. This search may produce one or more popularity metrics that may be added to enrich the titles.

For those titles not returning popularity data or only returning limited popularity data, a content based ML model 410 may be implemented to predict popularity estimates for the candidate content asset. For each new title, these content based models will be implemented to predict a candidate content asset popularity estimation. For example, a popularity score may be predicted by using wiki-pop, published box office revenue, streaming statistics or downloads, with regression models or KNN (K Nearest Neighbor) modeling, etc. KNN is a model that classifies data points based on the points that are most similar to it. It uses test data to make an "educated guess" on what an unclassified point should be classified as.

Alternatively, or in addition, metadata or popularity data uncovered during the search or ML processes may be used to support any of the title enrichment methods. In some embodiments, metadata located during the embedding process may be used to support the popularity estimate and vice versa. For example, obtained metadata that reveals a specific popular actor associated with a title may be used to improve the popularity estimate.

Metadata for ascertained embeddings and popularity are embedded with the title of the candidate content asset 412. For example, a metadata file is added to the title or a link to the metadata stored in a database is provided.

Figure 5:
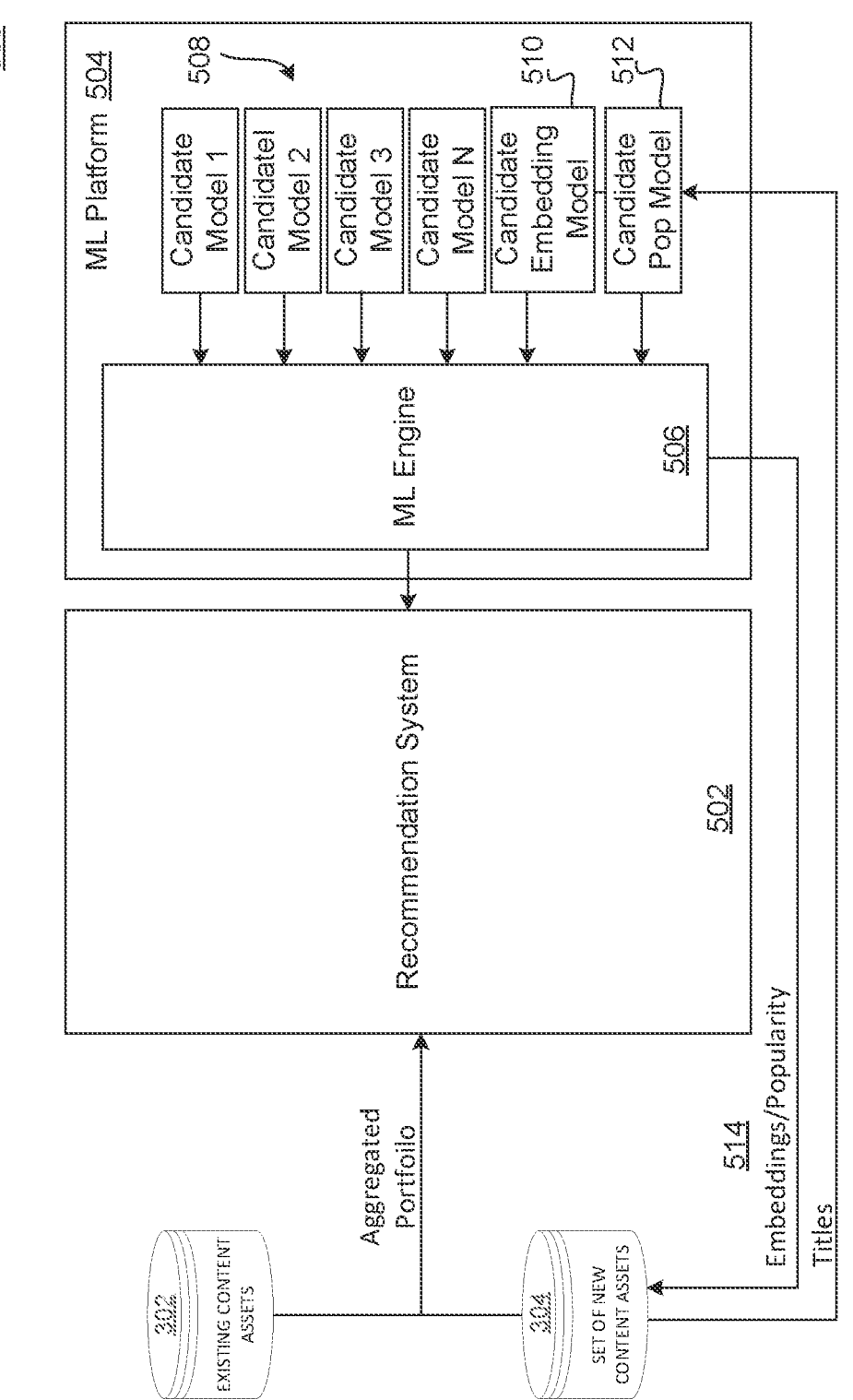
FIG. 5 illustrates another example diagram of a content acquisition recommendation system, according to some embodiments.

FIG. 5 illustrates another example diagram of a content acquisition recommendation system 500, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

Content acquisition recommendation system 500 may be implemented with a recommendation system 502 and a machine learning platform 504. Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine learning engine 506 may use various classifiers to map concepts associated with a specific content structure to capture relationships between concepts (e.g., watch signal topics) and the content. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify content watch patterns and associated future content selections within varying content structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of content recognition, a dataset of movies and genre matches may be used.

In some embodiments, machine learning models are trained with other customer's historical information (e.g., watch history). In addition, large training sets of the other customer's historical information may be used to normalize prediction data (e.g., not skewed by a single or few occurrences of a data artifact). Thereafter, the predictive candidate models 508 models may classify a specific user's historic watch data based on positive (e.g., movie selections, frequency of watching, etc.) or negative labels (e.g., no longer watching, etc.) against the trained predictive model to predict preferences and generate or enhance a previous profile. In one embodiment, the customer specific profile is continuously updated as new watch instances from this customer occur.

As shown, a series of desired predictive candidate models 508, 1-N, may be fed into the ML engine 506 to predict a candidate model that may be satisfied by a set of predicted user's upcoming content selections. In some embodiments, an output of the ML Platform 504 is a matrix of possible content choices based on matching a predicted candidate model implementing a specific impact metric objective to predicted user content selections. Predicted user content selections may include, but are not limited to, open an OTT platform application, execute a first time view, establish a qualified streaming session (1, 5, 15, minutes or more), signup or subscribe to the OTT service, resume watching of targeted content, complete watching a targeted/sponsorship program, etc.

For example, if an acquisition strategy is based on seeking users who would be predicted to meet a qualified streaming session, then the ML Platform may assign a candidate model 508 for a content category taxonomy facet such as 'new this month', trending now, popular, watch next etc. Each of these categories will correspond to one or more content tiles that are selected as recommended for the user. The recommendation service that runs in the background will offer a ranked list of content tiles specifically for this user by content category.

In some embodiments, a user profile database may provide user profile information that may be used with the recommendation system 502 to provide process recommendations for a specific user profile (e.g., users under 20). In some embodiments, the user's profile metadata may be considered during training of the candidate model(s) 508. For example, the candidate model may be trained to adjust weighting of an object's significance according to a user's profile metadata until the model can predict a success rate (e.g., user selects content title) above a selected threshold. For example, if a predetermined success threshold is a 0.5% selection of the content by the user, then the weighting of each metadata to extract from content assets and match from the user's profile are modified until the threshold is met. For example, an age group's affinity for actors, characters, genres, themes, etc. may have their weighting adjusted until the threshold is met or is trending towards the threshold.

In some embodiments, the candidate embedding predictive model 510 may implement a metadata recognition model. Example models, may include, but are not limited to, session-based models, sequential models, a STMP (Spatial Temporal Multi-level Proposal) model, a Meta model that may include a set of questions designed to identify information, a s2v (sense2vector) model, where a similarity is measured as a cosine similarity between user embedding and content embedding, or a two-tower model that may be implemented as a neural network with two sub-models that learn representations for queries and candidates separately.

In some embodiments, the candidate embedding predictive model 510 may implement a metadata recognition model based on images. Content acquisition recommendation system 500 may search for imagery related to the titles. The recommendation system will generate metadata recommendations for user X by training a ML object recognition model with examples of image-to-object matches that may be extracted and recognized. The object recognition model will analyze the imagery from any located candidate content asset imagery and recognize one or more content objects. These objects may be subsequently identified by their known metadata (e.g., actor's name or character). Objects may include, but are not limited to, characters, actors, genres, themes, media series, text (e.g., titles), etc.

The recommendation system uses popularity data in addition to the metadata used for classification. Candidate popularity model 512 is processed by the ML engine 506 to add one or more popularity metrics to enrich the candidate titles. For each new title, candidate popularity model 512 may, when popularity data is not included with the title, be implemented to predict a candidate content asset popularity estimation. For example, a popularity score may be predicted by using wiki-pop, box revenue, with regression models or KNN (K Nearest Neighbor) modelling, etc. KNN is a model that classifies data points based on the points that are most similar to it. It uses test data to make an "educated guess" on what an unclassified point should be classified as.

Results from the candidate embedding model 510 and popularity model 512 are fed back 514 to enrich titles of the set of new content assets 304 with the metadata and popularity data before combining with the existing content assets to form the aggregated portfolio to be processed as a forward simulation by recommendation system 502.

FIG. 6 is a flow chart depicting a content acquisition recommendation method that can be carried out in line with the discussion above. One or more of the operations in the method depicted by FIG. 6 may be carried out by one or more entities, including, without limitation, system server 126, media system 104 or content server 120, and/or one or more entities operating on behalf of or in cooperation with these or other entities. Any such entity may embody a computing system, such as a programmed processing unit or the like, configured to carry out one or more of the method operations. Further, a non-transitory data storage (e.g., disc storage, flash storage, or other computer readable medium) may have stored thereon instructions executable by a processing unit to carry out the various depicted operations.

In 602, the content acquisition recommendation system selects one or more candidate content assets. For example, the one or more candidate content assets may be a set of titles being offered by a content provider for purchase or licensing. This set of candidates may be further broken down into smaller subsets by genre, date of production, number of related assets (e.g., a series or grouping of related movies), to name a few.

In 604, the content acquisition recommendation system generates an embedding for the set of candidate content assets. The step of generating embedding may be, in some embodiments, confirming that one or more metadata describing the title is included in the set of titles. In some embodiments, the content acquisition recommendation system may process the selected set of candidate content assets to enrich the titles with the metadata by searching for the titles and extracting and associating any metadata located during the search. In some embodiments, the content acquisition recommendation system may process the selected set of candidate content assets to enrich the titles with the metadata by a ML predictive model. The ML predictive model may obtain the metadata based on a similarity to other titles, based on other metadata located during the search, or based on extracting metadata from imagery associated with the titles, as described in FIG. 4.

In 606, the content acquisition recommendation system generates a popularity score estimate for the set of candidate content assets. The step of generating a popularity score estimate may be, in some embodiments, confirming that one or more popularity metrics was provided with the candidate content titles. In some embodiments, the system may search for preexisting popularity data for a candidate content asset title. For example, the search may be of the same title in one or more available content asset databases accessible by the content acquisition recommendation system 300. This search may produce one or more popularity metrics that may be added to enrich the titles. For those titles not returning popularity data or only returning limited popularity data, a content based model may be implemented to generate popularity estimates for the candidate content asset. For each new title, these content based models may be implemented to predict a candidate content asset popularity estimation based, for example, of similar titles.

In 608, the content acquisition recommendation system aggregates the selected candidate content assets with a set of existing content assets to form an aggregated portfolio. Metadata and popularity data obtained for the set of candidate content assets will be included during the aggregation. The set of existing content assets may also include one or more respective embeddings and popularity data associated with each of the respective titles.

In 610, the content acquisition recommendation system selects a ML trained candidate model to run a simulation of the aggregated portfolio. The candidate models may be continuously updated as demographics change, user interests' change, user streaming habits change, content popularity changes, content changes (e.g., new format or arrangement), streaming metrics change, etc.

In 612, the content acquisition recommendation system selects a target set of users for the simulation of the aggregated portfolio. For example, a simulation of the aggregated portfolio may be for a select target age group or geographic location (e.g., in Europe), to name a few.

In 614, the content acquisition recommendation system generates, for at least a portion of the target set of users and based on the selected trained machine learning candidate models, a result set of recommended content assets. For example, a recommendation set may be produced for a sampling of X percent of users of the existing content asset portfolio.

In 616, the content acquisition recommendation system determines an impact of the candidate content assets on the existing content asset portfolio. For example, the content acquisition recommendation system determines an impact of the candidate content assets located in the result set of recommended content assets, wherein the impact is based on a comparison of at least one streaming metric of the result set to a corresponding metric of the set of existing content assets. For example, does the aggregated set have a measurable streaming performance benefit over the existing content asset portfolio without the candidate content assets?

In 618, the content acquisition recommendation system extracts a rank of each of the candidate content assets located in the result set of recommended content assets. The rank may be used as an acquisition position for each of the candidate content assets.

In 620, the content acquisition recommendation system generates a proposal for acquisition of one or more candidate content assets. The decision for a content acquisition recommendation may be an aggregation of an impact on the set of contents (incremental impact for new account acquisition, streaming, reach, or retention) and the cost of the new contents. For example, if the overall impact is above a selected target percentage (e.g., >0.5%), a recommendation may be proffered to acquire the entire candidate set assets (e.g., purchase or license). Alternatively, or in addition, the impact may be measured against a specific category of assets to see the net effect. Alternatively, or in addition, only highly ranked candidate content assets may be recognized for acquisition. And lastly, based on a low or break-even (e.g., zero percent) impact, no candidate content assets may be selected for acquisition.

The solution described above marries several key technical components that are lacking in the current selection of new content. The various embodiments solve the technical problem of selecting content for OTT data streaming platforms. It considers new candidate assets and implements a content recommendation system powered content ranking.

By doing this, the recommendation system performs a forward simulation of an existing content portfolio with candidate content assets included. The forward simulator may be used to generate an impression distribution of the new contents so that other ML models within the recommendation systems can use it to predict streaming time, reach, demographics, etc.

While described for a "set of content assets" throughout the descriptions, the set may be a single candidate, a set of similar candidates or a plurality of sets of similar content candidate assets without departing from the scope of the technology described herein. In some embodiments, the content acquisition recommendation system may be implemented by the client.

Example Computer System

Figure 7:
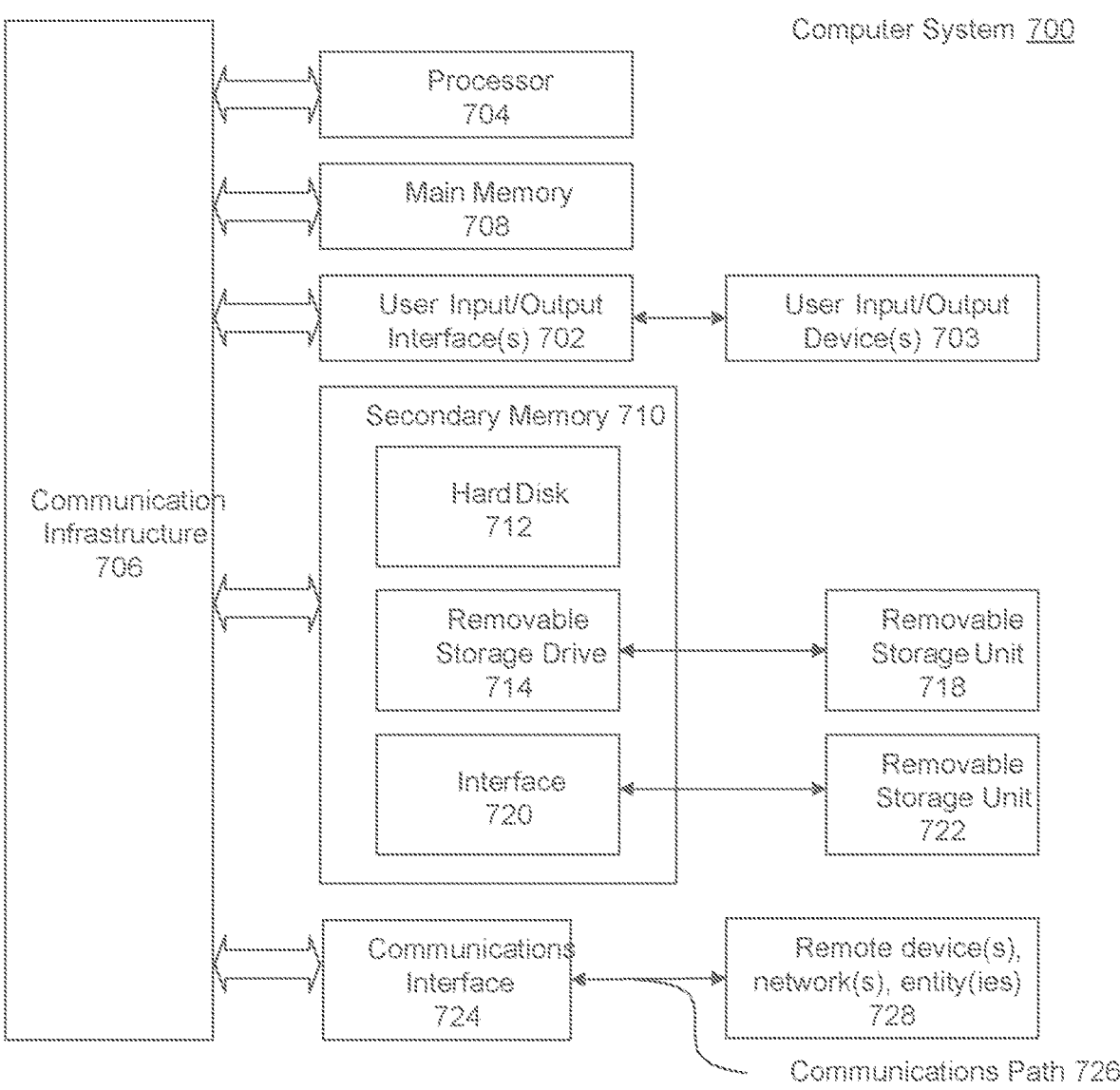
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for content asset acquisition, the method comprising:

generating a set of candidate content assets;

generating embeddings for the set of candidate content assets;

generating popularity score estimates for the set of candidate content assets;

aggregating the set of candidate content assets with a set of existing content assets to generate a simulation set of content assets;

determining a target set of users for the simulation set of content assets;

generating, based on a forward simulation of predicted streaming within the simulation set of content assets and for at least a portion of the target set of users, a result set of recommended content assets;

determining an impact of the candidate content assets located in the result set of recommended content assets, wherein the impact is based on a comparison of at least one streaming metric of the result set to a corresponding metric of the set of existing content assets, and wherein the determining the impact further comprises predicting an increase or decrease of predicted streaming times based on the aggregating of the set of candidate assets with the set of existing content assets; and generating, based on the impact, a proposal for the content asset acquisition of the candidate content assets.

2. The method of claim 1, wherein the generating embeddings for the set of candidate content assets further comprises generating embeddings, for individual content assets within the set of candidate content assets, by one or more of:

confirming that one or more metadata is associated with the individual content assets within the set of candidate content assets;

searching content sources for the one or more metadata associated with the individual content assets within the set of candidate content assets; or implementing a trained embedding machine learning model to estimate the one or more metadata associated with the individual content assets within the set of candidate content assets.

3. The method of claim 1, wherein the generating popularity score estimates for the set of candidate content assets further comprises generating the popularity score estimates, for individual content assets within the set of candidate content assets, by any of:

confirming that one or more popularity score data is associated with the individual content assets within the set of candidate content assets;

searching content sources for the one or more popularity score data associated with the individual content assets within the set of candidate content assets; or implementing a trained popularity score estimate machine learning model to estimate the one or more popularity score data associated with the individual content assets within the set of candidate content assets.

4. The method of claim 1, wherein the aggregating the set of candidate content assets with the set of existing content assets to generate the simulation set of content assets further comprises: associating the embeddings and the popularity score estimates with a corresponding individual candidate content asset within the set of candidate content assets.

5. The method of claim 1, further comprising selecting a trained machine learning model to estimate metadata associated with the target set of users, wherein the metadata includes any of: demographics, user interests, user streaming habits, content popularity, content format, content arrangement, or streaming metrics.

6. The method of claim 1, wherein the at least a portion of the target set of users is based on a sampling of X percent of the users.

7. The method of claim 1, further comprising extracting a rank of each of the candidate content assets located in the result set of recommended content assets and ranking an acquisition position for each of the candidate content assets.

8. The method of claim 7, further comprising removing the candidate content assets located in the result set of recommended content assets from the proposal based on their ranking.

9. The method of claim 7, further comprising removing the candidate content assets located in the result set of recommended content assets from the set of candidate content assets based on their ranking and generating a new result set of recommended content assets.

10. The method of claim 1, wherein the impact comprises any of:

likelihood of a candidate content asset selection;

user reach;

new user traction; or number of active content streamers.

11. A system, comprising:

a memory; and at least one processor coupled to the memory and configured to perform operations comprising:

generating a set of candidate content assets for acquisition by a content distribution ecosystem;

generating embeddings for the set of candidate content assets;

generating popularity score estimates for the set of candidate content assets;

aggregating the set of candidate content assets with a set of existing content assets to generate a simulation set of content assets;

determining a target set of users for the simulation set of content assets;

generating, based on a forward simulation of predicted streaming within the simulation set and for at least a portion of the target set of users, a result set of recommended content assets;

determining an impact of the candidate content assets located in the result set of recommended content assets, wherein the impact is based on a comparison of at least one streaming metric of the result set to a corresponding metric of the set of existing content assets, and wherein the determining the impact further comprises predicting an increase or decrease of predicted streaming times based on the aggregating of the set of candidate assets with the set of existing content assets; and generating, based on the impact, a proposal for the acquisition of the candidate content assets.

12. The system of claim 11, wherein the generating embeddings for the set of candidate content assets further comprises generating embeddings, for individual content assets within the set of candidate content assets, by one or more of:

confirming that one or more metadata is associated with the individual content assets within the set of candidate content assets;

searching content sources for the one or more metadata associated with the individual content assets within the set of candidate content assets; or implementing a trained embedding machine learning model to estimate the one or more metadata associated with the individual content assets within the set of candidate content assets.

13. The system of claim 11, wherein the generating popularity score estimates for the set of candidate content assets further comprises generating the popularity score estimates, for individual content assets within the set of candidate content assets, by any of:

confirming that one or more popularity score data is associated with the individual content assets within the set of candidate content assets;

searching content sources for the one or more popularity score data associated with the individual content assets within the set of candidate content assets; or implementing a trained popularity score estimate machine learning model to estimate the one or more popularity score data associated with the individual content assets within the set of candidate content assets.

14. The system of claim 11, wherein the aggregating the set of candidate content assets with the set of existing content assets to generate the simulation set of content assets further comprises: associating the embeddings and the popularity score estimates with a corresponding individual candidate content asset within the set of candidate content assets.

15. The system of claim 14, the operations further comprising selecting a trained machine learning model to estimate metadata associated with the target set of users, wherein the metadata includes any of: demographics, user interests, user streaming habits, content popularity, content format, content arrangement, or streaming metrics.

16. The system of claim 11, wherein the at least a portion of the target set of users is based on a sampling of X percent of the users.

17. The system of claim 11, the operations further comprising:

extracting a rank of each of the candidate content assets located in the result set of recommended content assets and ranking an acquisition position for each of the candidate content assets; and removing the candidate content assets located in the result set of recommended content assets from the proposal based on their ranking.

18. A non-transitory computer-readable medium having instructions stored thereon that, when executed by at least one computing device, cause the at least one computing device to perform operations comprising:

generating a set of candidate content assets for acquisition by a content distribution ecosystem;

generating embeddings for the set of candidate content assets;

generating popularity score estimates for the set of candidate content assets;

aggregating the set of candidate content assets with a set of existing content assets to generate a simulation set of content assets;

determining a target set of users for the simulation set of content assets;

generating, based on a forward simulation of predicted streaming within the simulation set and for at least a portion of the target set of users, a result set of recommended content assets;

determining an impact of the candidate content assets located in the result set of recommended content assets, wherein the impact is based on a comparison of at least one streaming metric of the result set to a corresponding metric of the set of existing content assets, and wherein the determining the impact further comprises predicting an increase or decrease of predicted streaming times based on the aggregating of the set of candidate assets with the set of existing content assets; and generating, based on the impact, a proposal for the acquisition of the candidate content assets.

* * * * *